2,822,304
SUGAR TREATMENT

Donald W. Gillmore, Richard J. Grant, and Stanton B. Smith, Pittsburgh, Pa., assignors to Pittsburgh Coke & Chemical Company, Pittsburgh, Pa., a corporation of Pennsylvania No Drawing. Application March 29, 1956
Serial No. 574,625

13 Claims. (Cl. 127—55)

The present invention relates to decolorizing and purifying impure solutions of polysaccharides, more especially sucrose.

Activated carbons are extremely efficient adsorbents for the decolorization and purification of sucrose liquors, but they have the undesirable property of lowering the pH of the contacting solution which results in losses due to inversion of the sucrose and in contamination from the acid-soluble ash constituents of the carbon. Other carbonaceous adsorbents, such as bonechar, exhibit this pH-lowering effect on cane sugar liquors, but to a lesser degree, in accordance with the surface area and activity of the adsorbent. The addition of alkali, such as for example lime, to the feed liquor can be used to offset this pH-lowering effect, but has the disadvantage that there frequently is significant ash contamination of the treated solution. Furthermore, the alkaline agent must be added continually and carefully to avoid over-alkalizing of the solution which, in turn, decreases the decolorizing efficiency of the carbon and further contaminates the liquor. When a pH of 8 or above results, not only does the activated carbon lose its decolorizing capacity, but the sugar itself deteriorates, e. g., by polymerization, oxidation, etc.

It is an object of the present invention to more closely regulate the pH of a hydrolyzable polysaccharide solution which has been treated with a carbonaceous purifying and decolorizing agent.

Another object of the present invention is to purify and decolorize an impure sucrose solution with the aid of activated carbon while, at the same time, maintaining the pH at about 7.

An additional object of the present invention is to purify and decolorize an impure sucrose solution with the aid of activated carbon which is kept on stream for an increased time.

Still another object of the invention is to reduce inversion in the purification of cane sugar.

Further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by treating an impure solution of a hydrolyzable polysaccharide with a mixture of a carbonaceous material and dead-burned magnesite. The polysaccharide is preferably sucrose and cane sugar solutions, beet sugar solutions, as well as others can be employed. The process is especially effective with cane sugar solutions. While it is possible to use bonechar as the carbonaceous material, it has been found preferable to employ a granular activated carbon and to pass the impure cane sugar solution through a bed of the mixture of granular activated carbon and dead-burned magnesite.

It is critical that dead-burned magnesite be employed. It has been found that dead-burned magnesite gives excellent pH control with cane sugar liquors in contact with granular activated carbon, the pH generally being 7.0±0.5 while, at the same time, the dead-burned magnesite contributes only slightly to the ash content of the liquors. The dead-burned magnesite is composed of dense hard grains or granules which do not disintegrate or abrade under the severest handling conditions. The dead-burned magnesite is stable at elevated temperatures in the presence of steam, air and combustion gases and, consequently, need not be replaced or renewed, even though the carbon is regenerated thermally many times. New dead-burned magnesite would have to be added only occasionally to offset losses due to solubility. The dead-burned magnesite maintains its range of limited solubility, even upon repeated reactivation of the carbon. Preferably, 5 to 10% of granular, dead-burned magnesite by weight of the granular activated carbon is employed to control the pH of cane sugar liquors in column operations at the temperatures and flow rates conventionally employed in cane sugar refining, e. g., 130 to 180° F. and 0.5 to 1.0 gallon per minute per sq. ft. of cross-sectional bed area. It is possible to use more, e. g., 15%, or less, e. g., 1%, of the dead-burned magnesite than the preferred proportions recited above.

The use of conventional calcium oxide, magnesium oxide or even dead-burned limestone is not satisfactory as a substitute for dead-burned magnesite for use with the carbonaceous decolorizer. All of these materials dissolve too readily and give too alkaline a pH to the sugar solution and also give undesirable increases in ash content. In fact, even the use of caustic magnesite imparts too high a pH to the sugar solution. Caustic magnesite is prepared by calcining magnesite at a temperature not over about 800° C., which corresponds to red heat.

Dead-burned magnesite is generally prepared by calcining magnesite at 1540 to 1845° C., preferably, about 1650° C. The dead-burned magnesite also is prepared by similarly heating chemically precipitated magnesium hydroxide. Cape May magnesite is a dead-burned magnesite of this type.

Examples of usable dead-burned magnesites with analyses are:

|  | Cape May | Chewelah High Grade | Chewelah Brown Pepple |
| --- | --- | --- | --- |
|  | Percent | Percent | Percent |
| MgO | 95 | 90 | 83 |
| SiO$_2$ | 3–4.5 | 5 | 7 |
| CaO | 1.5 | 2–2.5 | 5–6 |
| Al$_2$O$_3$ | 0.4 | 1.5 | 1.75–2 |
| Fe$_2$O$_3$ | 0.8 | 1–1.5 | 4–4.25 |

Preferably, the dead-burned magnesite is one having a calcium oxide content below 2% and an iron oxide content also below 2%. The iron content is kept at a minimum to prevent contamination, as acidic liquors leach out the iron. On the other hand, if too much calcium oxide is present, the alkalinity of the liquors will be increased. At present, the preferred dead-burned magnesite is the Cape May type.

The intimate mixture of the dead-burned magnesite and activated carbon can be made in any conventional fashion, e. g., by tumbling the two materials together or by charging the materials simultaneously to the filter vessel preferably in the presence of liquor. The magnesite and activated carbon can have the same particle size, but it has frequently been found desirable to use dead-burned magnesite having a smaller particle size than the activated carbon, in order to give equal settling velocities. This is especially advantageous in maintaining the mixture uniform when it is subjected to regeneration. For example, it has been found that 40 x 50 mesh dead-burned Cape May magnesite, used with 18 x 20 mesh activated carbon of Pittsburgh type CAL, gives equal settling velocities.

Using 12 x 40 mesh activated carbon, Pittsburgh type CAL, dead-burned magnesites of 6 x 40 mesh, 12 x 40 mesh and 20 x 50 mesh have been employed in laboratory, pilot plant and plant tests in treating cane sugar solutions. To minimize segregation during charging and handling, magnesite of closer and finer mesh is sometimes desirable, e. g., 30 x 40 mesh or 40 x 50 mesh, as previously set forth.

Dead-burned magnesite, Cape May type, has the following typical physical properties:

Bulk density (12 x 40 mesh), g./cc_____ 1.935
Void volume (12 x 40 mesh, dense packed), percent-vol_____ 36
Particle density (Hg displacement), g./cc_____ 3.027
Real density (Hg displacement), g./cc_____ 3.458
Pore volume, cc./g_____ 0.041
Surface area (BET, nitrogen, m.$^2$/g)_____ 0.08

Activated carbon Pittsburgh type CAL has the following typical physical properties:

Bulk density (12 x 40 mesh), g./cc_____ 0.442
Void volume (12 x 40 mesh, dense packed), percent-vol_____ 38
Particle density (Hg displacement), g./cc_____ 0.708
Real density (Hg displacement), g./cc_____ 2.125
Pore volume, cc./g_____ 0.942
Surface area (BET, nitrogen), m.$^2$/g_____ 1180

Regeneration of the spent mixture of dead-burned magnesite and activated carbon can be carried out in the manner conventionally employed in regenerating activated carbon alone. For example, it can be accomplished by oxidizing the spent carbon in an atmosphere containing steam and/or air at temperatures from about 1200° F. to 1800° F.

The intimate mixture of dead-burned magnesite and activated carbon can be made merely by physically mixing individual particles of the two, as previously set forth. Alternatively, it is possible to form pellets containing both carbon and dead-burned magnesite mixed with starch, water and pitch as a binder by extrusion and then subjecting the extruded pellets to thermal conditions which activate the carbon.

The concentration of the cane sugar liquors passed through the column of dead-burned magnesite and activated carbon is not especially critical, but for convenience, cane sugar liquors of 55° to 65° Brix are usually used. Higher or lower Brix liquors, however, can also be processed. Among the types of liquors which can be used are clarified (defecated), filtered or washed raw sugar liquors, char-treated liquor (filtered raw sugar liquor treated with bonechar), remelts and affination syrup. pH control is most essential on clarified or filtered raw sugar liquor to minimize inversion and, hence, the present invention is of primary importance when used with liquors of that type.

As previously stated, the flow rates most suitable for cane sugar refining, based on present knowledge, are 0.5 to 1.0 gallon per minute/sq. ft. of bed area; for a standard filter, 10 feet in diameter by 20 feet in length, this is equivalent to 40 to 80 gallons per minute; a superficial linear velocity of 4 to 8 feet/hour and contact time of about 75 to 150 minutes (based on a 45% void volume in the bed; charged bulk density of the bed being 24 lbs./cu. ft.).

One of the outstanding advantages of the present invention is that the mixture of dead-burned magnesite and activated carbon can remain on stream for 8 days or even as long as 28 days, in contrast to the 3 days or less normally employed with bonechar.

All mesh sizes are U. S. Sieve Series.

Unless otherwise stated in the following examples, the cane sugar liquors were treated with dead-burned magnesite of the Cape May type, described above, of 12 x 40 mesh, while the activated carbon was also of 12 x 40 mesh. The term CAL designates Pittsburgh type CAL activated carbon; the reactivated CAL carbons are made by reactivating spent CAL in the manner described above, after the CAL has been exhausted by being on stream with an impure cane sugar liquor.

Unless otherwise stated, all percentages of magnesite in the examples are based on the weight of the carbon.

*Example I*

In this example, 60° Brix liquors were percolated downflow at 36 cc./hr. through 40 g. (90 cc.) of adsorbent at 80° C. (176° F.) in a 1¼ inch inner diameter, 7 inch long column. Equilibrium pH values on the products were taken after 500 cc. of effluent were collected in each case.

| Liquor | Adsorbent | pH | | |
|---|---|---|---|---|
| | | Influent | Initial Product | Equilibrium Product |
| Char_____ | CAL_____ | 6.40 | 6.15 | 5.05 |
| Do_____ | CAL+10% d.b. magnesite. | 6.40 | 6.60 | 6.50 |
| Clarified__ | CAL_____ | 7.00 | 7.00 | 5.80 |
| Do_____ | Reactivated CAL___ | 7.00 | 6.90 | 6.20 |
| Do_____ | Reactivated CAL+10% d.b. magnesite. | 7.00 | 8.45 | 7.40 |

*Example II*

In another laboratory test, there was used 3240 grams of a reactivated mixture of single-cycle (once used) CAL carbon and 10% dead-burned magnesite in a column 2 inches in diameter and 14 feet long. 58.6° Brix clarified liquor at a pH of 6.9 was flowed downward through the column at the average rate of 38 cc./min. (0.5 G. P. M./sq. ft.) at 80 to 85° C. (176 to 185° F.). After 71 hours of continuous operation, the pH of the effluent from the 14 foot column was 7.4. 94% of the color originally present in the clairfied liquor was removed and there was no ash contamination or significant inversion during the entire operation.

*Example III*

Substantially the same results are obtained as in Example II, if the particle size of the dead-burned magnesite is changed to 40 x 50 mesh, while the activated carbon particle size is changed to 18 x 20 mesh. Upon reactivation, a more uniform adsorption agent mixture is obtained with the mixture of Example III than that of Example II.

*Example IV*

Reactivated two-cycle CAL carbon was mixed with 5% of the dead-burned magnesite and charged to a plant filter 10 feet in diameter and 18 feet deep. The filter required about 1200 cubic feet of the adsorbent mixture. The results obtained with two different liquors in comparison to those with reactivated carbon alone were as follows:

| Liquor | Absorbent | Volume Processed, Gallons | Days on Stream | Temperature, °F. | Flow Rate average, G.P.M. | pH (average) | | |
|---|---|---|---|---|---|---|---|---|
| | | | | | | feed | product | difference |
| Char | Reactivated 1-cycle CAL. | 705,000 | 8 | 155-165 | 60 | 6.09 | 6.01 | −0.08 |
| Clarified | ----do-------------- | 300,000 | 11 | 160-170 | 20 | 6.90 | 5.73 | −1.19 |
| Char | Reactivated 2-cycle CAL plus 5% d.b. magnesite | 1,375,000 | 21 | 155-165 | 45 | 6.26 | 6.85 | +0.59 |
| Clarified | ----do-------------- | 390,000 | 14 | 160-170 | 20 | 7.01 | 6.75 | −0.26 |

In this example, the carbon-magnesite mixture was on stream for 21 days with the char liquor and 14 days with the clarified liquor. While the pH of the product from the char liquor consistently was at a value of about 0.5 unit higher than the initial pH of 6.26 throughout the run, it is of interest to note that in a comparison run in which the dead-burned magnesite was omitted, the pH of the product had fallen to 5.8 over a period of 8 days. In the case of clarified liquor the pH of the treated liquor fell from about 7.0 to only 6.8 after 14 days when dead-burned magnesite was admixed with the carbon, while without dead-burned magnesite the pH had dropped to 5.7 in only 11 days. The incorporation of dead-burned magnesite in the adsorbent, consequently, decreased the amount of inversion and did not impart any significant ash contamination. Both the char liquor and clarified liquor were of about 60° Brix.

*Example V*

Using the same filter as in Example IV, there was used a reactivated mixture of CAL carbon and 5% dead-burned magnesite. 2,700,000 gallons of char liquor of about 60° Brix were treated at 160 to 170° F. at an average flow rate of 65 G. P. M. The pH of the product was substantially constant and averaged 6.7 as against 6.1 for the feed. This was an increase of 0.6 pH unit. The adsorbent mixture was on stream for over 27 days during the run.

*Example VI*

In this example, the filter had an internal diameter of 2 feet and a length of 28.5 feet. Into the filter was placed an intimate mixture of 2,160 lbs. of CAL activated carbon (12 x 40 mesh) and 108 lbs. of dead-burned magnesite (6 x 40 mesh). The temperature throughout the process was 131° F. The feed consisted of 58.2° Brix clarified and filtered raw sugar. The rate of flow was 13.2 G. P. M. or 0.42 G. P. M. per square foot. The duration of the run was 641 hours (over 26 days). The color removal (average) was 85%. pH control was obtained as indicated in the following table:

FEED pH

| Initial | 100 hr. | 200 hr. | 300 hr. | 400 hr. | 500 hr. | 600 hr. | Average |
|---|---|---|---|---|---|---|---|
| 6.4 | 6.4 | 6.5 | 6.7 | 6.8 | 6.7 | 6.8 | 6.61 |

PRODUCT pH

| 6.9 | 6.3 | 6.3 | 6.5 | 6.6 | 6.6 | 6.6 | 6.57 |

From the above examples, it can be seen that the use of dead-burned magnesite is eminently successful in maintaining the pH of the purified sugar product close to the neutral point. If the dead-burned magnesite is one which is high in calcium, the pH initially will be slightly higher than the preferred range, but this condition will rapidly adjust itself and for the balance of the run and in subsequent runs after reactivation of the activated carbon dead-burned magnesite mixture, there is no problem of undue alkalinity.

We claim:
1. A process of treating an impure readily hydrolyzable polysaccharide solution to decolorize and purify the same, comprising treating the solution with an activated carbonaceous adsorbent material and dead-burned magnesite in an amount effective to control the pH of the solution and up to 15% by weight of the carbonaceous material.

2. A process of treating an impure sucrose solution to decolorize and purify the same, comprising treating the solution with activated carbon and dead-burned magnesite in an amount effective to control the pH of the solution and up to 15% by weight of the carbonaceous material.

3. A process of treating an impure cane sugar solution to decolorize and purify the same, comprising passing the solution through a bed containing granular activated carbon and dead-burned magnesite in an amount effective to control the pH of the solution and up to 15% by weight of the carbonaceous material.

4. A process according to claim 3, wherein the dead-burned magnesite is present in an amount of about 5 to 10% by weight of the activated carbon.

5. A process according to claim 3, wherein the bed is maintained on stream for at least eight days.

6. A process according to claim 3, wherein the mixture of activated carbon and dead-burned magnesite is regenerated after being on stream and is then again placed on stream to purify and decolorize further impure cane sugar solution.

7. A process according to claim 3, wherein the particle size of the dead-burned magnesite is smaller than that of the activated carbon.

8. A process according to claim 3, wherein the particle size of the dead-burned magnesite is approximately the same as that of the activated carbon.

9. A mixture of activated carbon and a minor amount of dead-burned magnesite up to 15% by weight of the activated carbon.

10. A mixture as in claim 9, wherein the dead-burned magnesite is present in an amount of about 5 to 10% by weight of the activated carbon.

11. A process according to claim 1 wherein the dead-burned magnesite is present in an amount of about 1 to 15% by weight of the activated carbon.

12. A process according to claim 1 wherein the carbonaceous material is bone char.

13. A process according to claim 1 wherein the dead-burned magnesite is of no greater particle size than 12 x 40 mesh.

References Cited in the file of this patent

UNITED STATES PATENTS

| 1,511,472 | Hood | Oct. 14, 1924 |
| 1,806,471 | Kramer | May 19, 1931 |
| 2,688,562 | West et al. | Sept. 7, 1954 |